United States Patent Office 3,282,994
Patented Nov. 1, 1966

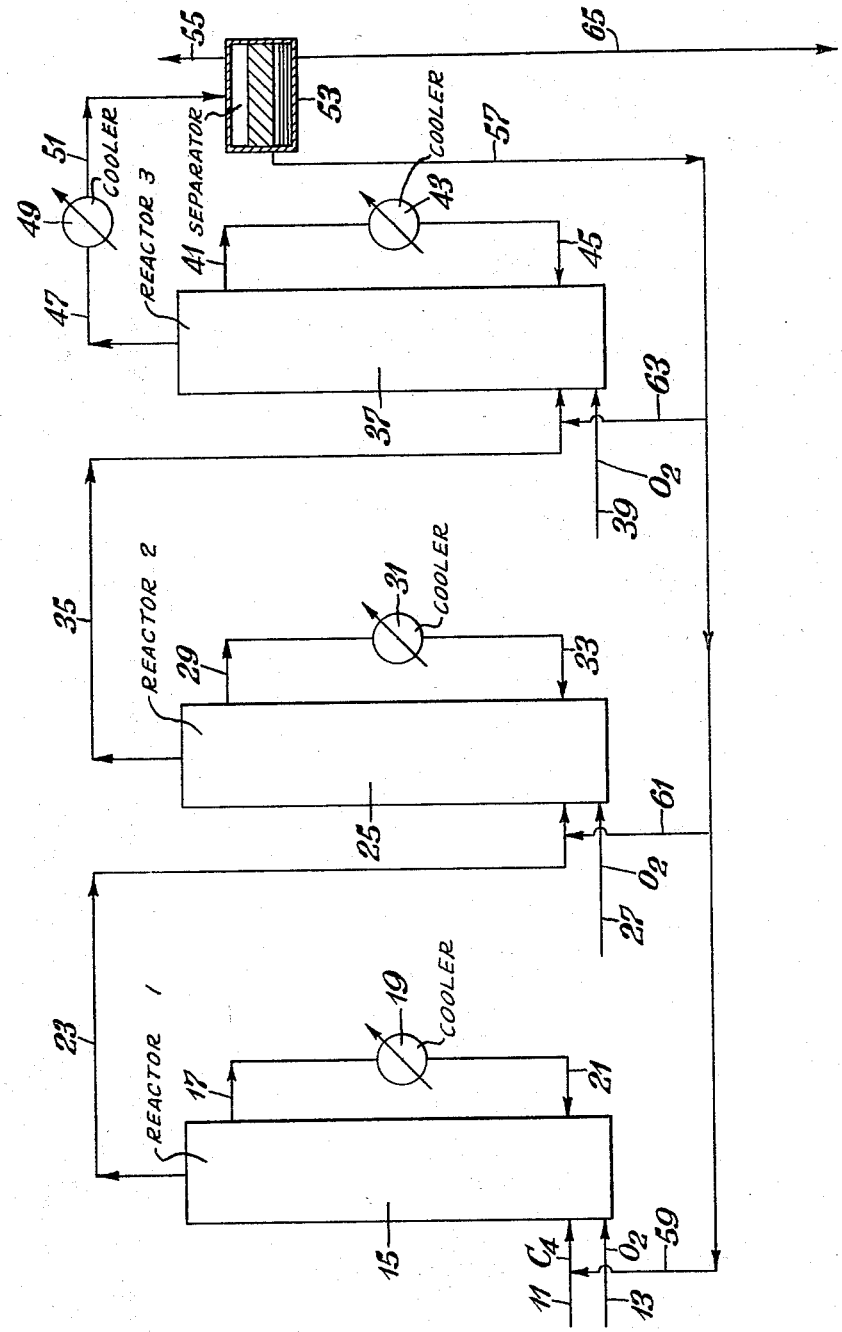

3,282,994
OXIDATION OF BUTANE
Norman R. Cox and Philip C. Johnson, St. Albans, and Donald R. Mosher, Charleston, W. Va., assignors to Union Carbide Corporation, a corporation of New York
Filed July 3, 1962, Ser. No. 207,297
4 Claims. (Cl. 260—533)

This invention relates to a novel process for the oxidation of butane in the liquid phase whereby valuable oxygenated organic compounds are produced. It is particularly related to a novel process for the production of methyl ethyl ketone and acetic acid by oxidation of butane in the liquid phase which process is capable of producing large quantities of methyl ethyl ketone. More particularly, this invention is related to a novel process for the production of methyl ethyl ketone and acetic acid by oxidation of butane in the liquid phase wherein the degree of productivity is extraordinarily and markedly higher than that of the prior art processes.

Direct oxidation of saturated aliphatic hydrocarbons such as propane, butane, pentane, hexane, heptane, or mixtures of these hydrocarbons, with oxygen, is well known. Extensive study and research investigations in the general area of butane oxidation have culminated in numerous patents and publications in this field. However, the prior art is devoid of any teaching or suggesion as to how to increase the productivity of butane oxidation process in the liquid phase. By "productivity" is meant the rate of production of valuable oxygenated organic compounds from a given process. Furthermore, the prior art processes in this field have been primarily directed to maximizing the production of acetic acid to the exclusion or substantial minimization of methyl ethyl ketone, and they are devoid of any teaching regarding controlled oxidation of butane to produce more methyl ethyl ketone than acetic acid. The difficulties and problems inherent to the prior art processes will be better understood with reference to the following generalized discussion of the butane oxidation process.

Basically, the non-catalytic oxidation of butane in the liquid phase is a relatively simple process. All that is required is butane and oxygen, charged to a suitable reactor, and a sufficient quantity of heat to initiate the reaction. Once initiated, the reaction is highly exothermic and adequate heat removal from and temperature control within the reactor becomes essential to successful operation, particularly in commercial units. Thus, unless adequate heat removal means are provided, temperature control becomes exceedingly difficult and the "selectivity" and operational efficiency of the process will therefore be greatly impaired. By "selectivity" is meant the selective production of a particular oxidation product or products. Furthermore, excessive temperature rise in the reactor may result in oxidative degradation of the products and/or explosion of the reaction mixture.

The oxidation of butane has heretofore been conducted in so-called tank reactors in which the length to diameter (L:D) ratios of the reactors are generally low, e.g., about 15:1 or lower. Heat removal and temperature control in the reactor have heretofore been accomplished either by slow and controlled oxidation of butane (low oxygen concentration and/or slow butane feed rate) or by using large quantities of inert diluents such as nitrogen or inert organic compounds. These methods, however, necessitate operation at reduced rates and capacities and, they are accordingly inefficient and uneconomical commercially. The use of inert diluents also necessitates large reactors and equipment for the production of given quantities of valuable oxygenated organic compounds than if no diluents had been used.

As it was previously pointed out, the liquid phase oxidation of butane in tank reactors has heretofore resulted essentially in the production of acetic acid to the exclusion or substantial minimization of methyl ethyl ketone. None of the prior art processes has been concerned with the desirability of increasing the production of methyl ethyl ketone at the expense of decreasing that of acetic acid from the oxidation of butane in the liquid phase. Another problem which has heretofore not received the attention of the prior art, and which is of paramount commercial significance, is that of "productivity" of the butane oxidation process. The productivities of the prior art processes have been relatively low, generally of the order of about 10 pounds of liquid oxygenated organic compound per cubic foot of reactor volume per hour. Considerable economic improvement can be realized, however, if the productivity is effectively and markedly increased.

It has now been discovered that butane can be oxidized to produce markedly higher productivity of oxygenated organic compounds than has heretofore been possible to achieve by the prior art methods. The novel process contemplates contacting butane with oxygen in a plurality of reaction zones, in the presence of liquid recycle medium and/or normally liquid organic vehicle which maintains butane essentially in the liquid phase, each reaction zone being provided with a circulating cooling medium, under critically controlled conditions regarding the operative temperature, pressure, residence time of the liquid materials in each reaction zone, recycle rate, and the quantity of liquid circulation in each reaction zone.

By practicing the novel process as described herein the productivity of the butane oxidation process is markedly improved and the quantity of methyl ethyl ketone produced is unexpectedly increased. According to the novel process, butane and oxygen are continuously introduced into the first of a plurality of reaction zones which are connected in series and maintained at elevated temperatures and superatmospheric pressures, wherein each reaction zone is provided with a cooling circuit by withdrawing a portion of the liquid product reaction mixture from each said reaction zone, cooling and returning same to each said reaction zone. The effluent from each reaction zone together with additional oxygen from an oxygen source are introduced into the following reaction zone for further reaction, and finally, withdrawing a reaction product mixture from the last reaction zone, recycling a portion thereof to any one or more of said reaction zones, and recovering oxygenated organic compounds from the remainder.

The novel process will be more clearly understood with reference to the accompanying drawing which is a schematic flow diagram of one illustrative embodiment of this invention.

Referring to the drawing, liquid butane and oxygen are continuously introduced from external sources (not shown) via lines 11 and 13, respectively, into reaction zone 15 having a L:D ratio of 10:1 which is maintained at an elevated temperature of about 180° C. and pressure of about 800 p.s.i.g. The exothermic heat of reaction is removed by withdrawing a portion of the liquid from said reaction zone 15 via line 17, cooling same to about 150° C. by means of cooler 19 and returning the cooled liquid via line 21 to said reaction zone 15. The reaction product mixture from said reaction zone 15, which contains unreacted butane, is withdrawn via line 23 and conducted therethrough into reaction zone 25. Additional oxygen is supplied from an oxygen source (not shown) via line 27 to said reaction zone 25 to effect further reaction between unreacted butane and oxygen. The heat of reaction from reaction zone 25 is also removed by withdrawing a portion of the liquid from said reaction zone 25 via line 29, cooling same to about 150° C. by means of cooler 31 and returning the cooled liquid via line 33 to said reaction zone 25. The temperature and pressure in reaction zone 25 are essentially the same as those in reaction zone 15. The reaction product mixture from reaction zone 25 is withdrawn via line 35 and is conducted therethrough into reaction zone 37. Additional oxygen is supplied from an oxygen source (not shown) via line 39 to said reaction zone 37. The heat of reaction from reaction zone 37 is also removed by withdrawing a portion of the liquid from said reaction zone 37 via line 41, cooling same to about 150° C. by means of cooler 43 and returning the cooled liquid via line 45 to said reaction zone 37. The temperature and pressure in reaction zone 37 are essentially the same as those in reaction zones 15 and 25. The reaction product mixture from said reaction zone 37 is withdrawn via line 47, cooled to about 65° C. by means of cooler 49 and introduced via line 51 into a vessel 53 maintained under pressure. Uncondensed gaseous materials, e.g. $H_2$, $CO_2$, etc., are vented from said vessel 53 and the liquid allowed to separate into two layers in said vessel 53. The upper layer which contains butane is recycled to one or more of said reaction zones 15, 25 and 37 via lines 59, 61 and 63, respectively. The lower layer which contains oxygenated organic compounds is withdrawn via line 65 and the oxygenated organic compounds recovered therefrom by conventional methods.

In connection with the foregoing embodiment of the invention as illustrated by the drawing it is of course understood that many modifications and revisions can be made without substantially departing from the spirit of this invention. For example, each reaction zone may be provided with a separation zone, situated internally in the reaction zone or external thereto, for the removal of gaseous materials from the liquid prior to cooling and returning the liquid to the reaction zone.

The novel process can be carried out in a plurality of reaction zones, preferably 3 to 5 reaction zones, wherein the L:D ratio of each reaction zone is from about 1:1 to about 15:1, said reaction zones being connected in series, i.e., the reaction product mixture (effluent) flows from one reaction zone to the following reaction zone. Alternatively, two reaction zones may be superimposed in such a manner that the upper section of one reaction zone is directly connected with and is adjacent to the lower section of the following reaction zone.

The oxidation reaction is conveniently carried out at an elevated temperature, e.g., a temperature in the range of from about 125° C., and lower, to about 250° C., and higher, preferably from about 150° C. to about 200° C., under superatmospheric pressure, e.g., a pressure in the range of from about 500 p.s.i.g. to about 2000 p.s.i.g., preferably from about 700 p.s.i.g. to about 1200 p.s.i.g. in each reaction zone. Under these operative conditions substantially only liquid butane is oxidized to produce oxygenated organic compounds.

Heat removal from and temperature control within each reaction zone can be accomplished in the following manner. Each reaction zone is provided with a cooling means, such as, for example, a circulating cooling medium by withdrawing a portion of the liquid reaction product mixture from each zone in the manner hereinbefore described in connection with the drawing. It has been found that in large commercial units where it is extremely difficult, uneconomical and, in fact, impractical to achieve the desired heat removal and temperature control in said reaction zones by external cooling coils or by cooling jackets alone in view of the extremely large capacity and dimensions of the equipment involved, the provision of a circulating cooling medium for each reaction zone has great practical utility and permits adequate heat removal from and temperature control within said reaction zones. Consequently, the total quantity of liquid which may be handled per volume of each reaction zone per hour is markedly improved, and the productivity of the process is therefore considerably increased. In addition to heat removal from and temperature control within the reaction zones the circulating cooling medium serves an additional major function. This as well as the rate of liquid circulation through said circulating cooling medium will be discussed in connection with recycle to the reaction zones. The circulating cooling medium will hereinafter be referred to as "circulated liquid."

Butane feed rate to the reaction zones can vary depending upon the capacity of the reaction zones, production rate requirement, the rate of oxygen, the temperature and pressure in each reaction zone, and other operating variables involved. The butane is introduced into the first reaction zone wherein it is contacted with oxygen. It is imperative however that the butane flow rate to the first reaction zone and the liquid flow rate in each reaction zone be adjusted so that the liquid residence time in each reaction zone is at least about 30 seconds, preferably from about 40 seconds to about 15 minutes. As used herein, the residence time may be defined as the volume of each reaction zone divided by the liquid flow rate through said reaction zone.

Essentially pure oxygen, air or any oxygen-containing gas can be employed for the oxidation of butane in accordance with the novel process herein. Said gas is introduced separately to each reaction zone, at one or several points therein. The oxygen feed rate to the reaction zones is from about 1 to about 20 weight percent, preferably from about 5 to about 15 weight percent based on liquid butane entering the reaction zones (including liquid butane in the recycle).

The novel process is carried out in the absence of catalyst though well known hydrocarbon oxidation catalysts such as cobalt acetate, manganese acetate, manganese, cobalt and the like can be employed, if desired.

Recycle ratio (the volume of liquid recycle per volume of total reaction zones per hour) can vary from about 0.1 to about 100 gallons per gallon of reaction zone per hour, though we prefer to operate at recycle ratios of from about 5 to about 30 gallons per gallon of reaction zones per hour. The recycle medium can contain up to about 80 weight percent butane, the remainder being acetic acid, methyl ethyl ketone, oxygenated organic compounds, carbon dioxide, etc. Examples of some oxygenated organic compounds found in the recycle medium are methyl acetate, ethyl acetate, formic acid, methyl alcohol, ethyl alcohol, butyl alcohol, butyric acid, etc. The relative quantities of these compounds depend upon the operative temperature and pressure.

The recycle to the reaction zones and the circulated liquid through said cooling circuits serve at least two molar functions. In addition to facilitating heat removal from and temperature control within said reaction zones as it has been previously pointed out, they also serve to maintain butane in the liquid phase in each reaction zone. For example, acetic acid and/or methyl ethyl ketone in the recycle or in the circulated liquid serve to maintain butane dissolved therein, thus permitting the oxidation reaction to take place essential in the liquid phase in each reaction zone. Furthermore, by increasing the recycle ratio to the reaction zone and/or by increasing the rate of circulated liquid through said cooling circuits, the amount of butane in the liquid phase in each reaction zone is considerably increased, and the productivity of the process can therefore be markedly improved. The rate of circulated liquid through each one of said cooling circuits can very depending upon the capacity of each reaction zone, the productivity, the degree of cooling required in each reaction zone, etc. This rate, however, is from about 0.1 to about 10 gallons per gallon of recycle to the reaction zones, and it is preferably from about 1 to about 5 gallons per gallon of recycle to the reaction zones.

Although the novel process has been described in connection with butane as the hydrocarbon feed to the reaction zone, other saturated aliphatic hydrocarbons having from 3 to 7 carbon atoms such as propane, pentane, hexane, heptane, or mixtures of these hydrocarbons, may be oxidized in accordance with the novel process herein.

The products obtained from the novel process comprise largely methyl ethyl ketone, acetic acid, water and small quantities of other oxygenated organic compounds which are separated and recovered by conventional recovery methods such as distillation, extraction, etc.

The following examples serve to further illustrate the novel process of this invention.

EXAMPLE 1

Liquid butane was fed continuously to a stainless steel tank reactor by means of a high pressure positive displacement pump. The reactor which had a L:D ratio of 6:1 was equipped with external cooling coils and was maintained at 180° C. and at 800 p.s.i. A gas mixture comprising 85 weight percent oxygen and 15 weight percent nitrogen, precompressed to about 800 p.s.i.g., was introduced to the reactor near the butane inlet line in the lower section of the reactor. The effluent from the reactor was cooled to about 65° C. by a condenser and the cooled effluent was introduced into a separating vessel which was maintained at about 800 p.s.i.g., wherefrom gaseous materials were vented. The liquid was allowed to separate into two layers in said vessel. The upper layer comprising about 65 weight percent butane, the remainder being acetic acid, methyl ethyl ketone, oxygenated organic compounds, carbon dioxide, etc., recycled to the reaction zone at the rate of 5.9 gallons per gallon of reactor volume per hour. The lower layer comprising methyl ethyl ketone, acetic acid, other oxygenated organic compounds and water was withdrawn from said separating vessel and the various components were recovered by distillation. The oxygen fed to the reactor was 9.0 weight percent of liquid butane fed to the reactor (including butane from the recycle).

The productivity of this system was found to be 16.0 pounds of liquid products per hour per cubic foot of reactor valume and the ratio of acetic acid to methyl ethyl ketone in the final product mixture was 7.4 to 1.

EXAMPLE 2

Example 1 was repeated at the same operative conditions, the only difference being that the reactor, in addition to the external cooling coils, was provided with a cooling circuit as follows.

The effluent from the reactor was introduced into a separating vessel which was maintained under pressure wherefrom gaseous materials were separated from the liquid phase. A portion of this liquid was then cooled to about 160° C. by a condenser and the cooled liquid was returned to the reactor at a point in the lower section thereof. The remaining liquid and the separated gaseous materials from said vessel were cooled to 65° C. in a condenser and introduced into a second separating vessel wherefrom the gaseous materials were vented. The liquid was allowed to separate in said second separating vessel; the upper layer comprising about 65 weight percent butane, the remainder being acetic acid, methyl ethyl ketone, other oxygenated organic compounds, carbon dioxide, etc., was recycled to the reactor at the rate of 5.9 gallons per gallon of reactor per hour, and the lower layer comprising acetic acid, methyl ethyl ketone, water and other oxygenated organic compounds was withdrawn and the products recovered therefrom as in the previous example. The rate of liquid circulation through said cooling circuit was 3.6 gallons per gallon of recycle to the reactor. The oxygen fed to the reactor was 11 weight percent of liquid butane fed to the reactor (including liquid butane in the recycle) and the residence time of the liquid materials in the reactor was approximately 10 minutes.

Example 2 yields higher productivity and higher ratio of acetic acid to methyl ethyl ketone (9.4) than Example 1. Therefore, while the addition of a cooling circuit to a single tank reactor improves the productivity of the process, its application is limited due to the simultaneous increase in the production rate of acetic acid. Marked improvements both in productivity and selectivity (lower acetic acid to methyl ethyl ketone ratio), however, can be obtained by operating in the manner set forth by Example 3 below.

EXAMPLE 3

Liquid butane was fed continuously to a series of 3 stainless steel reactors, which were connected in series, by means of a high pressure positive displacement pump. The reactors each had a L:D ratio of 9:1, and were each equipped with external cooling coils and maintained at 180° C. and 800 p.s.i.g. A gas mixture comprising 95 weight percent oxygen and 5 weight percent nitrogen, precompressed to about 800 p.s.i.g., was introduced to each reactor at the lower section thereof, near the butane inlet line. Each reactor was provided with a cooling circuit by withdrawing the effluent at a point near the upper section of the reactor, separating the gaseous materials from the liquid in a separating vessel maintained at about 800 p.s.i.g., cooling a portion of the liquid from said vessel to 160° C. by a condenser and returning the cooled liquid to the reactor at a point in the lower section thereof. The remaining liquid and gaseous materials from said separating vessel were conducted to the next reactor in the series wherein further oxidation of butane was carried out in the liquid phase. The effluent from the third reactor was cooled to 65° C. in a condenser and the cooled effluent was introduced into a separating drum maintained at about 800 p.s.i.g. wherefrom gaseous materials were vented. The liquid in said drum was allowed to separate into two layers. The upper layer comprising approximately 65 weight percent butane, the remainder being acetic acid, methyl ethyl ketone, other oxygenated organic compounds, carbon dioxide, etc., was recycled to the first reactor at a rate of 6.3 gallons per gallon of total volume of reactors per hour. The lower layer comprising methyl ethyl ketone, acetic acid, other oxygenated organic compounds and water was withdrawn from said drum and the various components recovered therefrom by distillation. The oxygen fed to each reaction zone was about 4 weight percent of liquid butane entering each reaction zone (including liquid butane in the recycle).

The rate of liquid circulation through each cooling circuit was 2 gallons per gallon of recycle to the reactors. The productivity of this system was 24 pounds of liquid products per hour per cubic foot of reactor volumes and the ratio of acetic acid to methyl ethyl ketone was 5.9 to 1. The residence time of the liquid materials in each reaction zone was about 3 minutes.

Thus Example 3 illustrates that both the productivity and the methyl ethyl ketone production can be effectively increased by operating in accordance with the novel process.

The novel process as described and exemplified hereinbefore utilizes the recycle to the reactor and the circulated liquid as media for maintaining butane in the liquid phase in the reaction zones. As it was previously pointed out acetic acid and methyl ethyl ketone serve as solvents to maintain the butane dissolved therein. Alternatively, therefore, acetic acid or methyl ethyl ketone may be fed separately to one or more of said reaction zones in order to maintain butane essentially in the liquid phase. Other inert organic diluents such as saturated aliphatic monocyclic acids containing from 2 to 5 carbon atoms, saturated aliphatic ketones containing from 3 to 6 carbon atoms, saturated aliphatic alcohols containiing from 2 to 6 carbon atoms, alkyl esters of saturated aliphatic monocarboxylic acids containing from 3 to 12 carbon atoms, and the like, or any mixtures thereof can be employed to maintain butane essentially in the liquid phase in the reaction zone. By the term "inert diluent" herein we mean a diluent which serves to maintain butane in the liquid phase but which itself is resistant to oxidation at the operative conditions set forth by this novel process.

What is claimed is:

1. A process for increasing the productivity of oxygenated organic compounds predominating in acetic acid and methyl ethyl ketone and having improved ratio of methyl ethyl ketone to acetic acid which comprises the steps:
   (a) reacting butane and oxygen in the first of a plurality of reaction zones in series, the length to diameter ratio of each reaction zone being less than about 15:1,
   (b) effecting the reaction essentially in the liquid phase in each reaction zone at a temperature of from about 125° C. to about 250° C., a pressure of from about 500 p.s.i.g. to about 2000 p.s.i.g. and an oxygen concentration of from about 1 to about 20 weight percent based on the weight of butane in the reactor,
   (c) introducing the effluent from each reaction zone to the next reaction zone together with added oxygen and maintaining essentially the same conditions in each reaction zone,
   (d) maintaining a liquid residence time of at least 30 seconds in each reaction zone,
   (e) withdrawing the effluent from the last reaction zone, cooling said effluent and degasifying said cooled effluent in a separation zone wherein two liquid layers are formed, an upper butane layer and a lower reaction product layer,
   (f) externally recycling said upper layer to said reaction zones at the rate of about 0.1 to about 100 gallons of recycle per gallon of reaction zones,
   (g) withdrawing liquid reaction product mixture from each reaction zone, cooling and returning same to its respective reaction zone at the rate of about 1 to about 5 gallons per gallon of said external recycle, and
   (h) withdrawing the lower layer from said separation zone as product.

2. The process of claim 1 wherein three reaction zones are employed.

3. A process for increasing the productivity of oxygenated organic compounds predominating in acetic acid and methyl ethyl ketone and having improved ratio of methyl ethyl ketone to acetic acid which comprises the steps:
   (a) reacting butane and oxygen in the first of a plurality of reaction zones in series, the length to diameter ratio of each reaction zone being less than about 15:1,
   (b) effecting the reaction essentially in the liquid phase in each reaction zone at a temperature of from about 150° C. to about 200° C., a pressure of from about 700 p.s.i.g. to about 1200 p.s.i.g. and an oxygen concentration of from about 5 to about 15 weight percent based on the weight of butane in the reactor,
   (c) introducing the effluent from each reaction zone to the next reaction zone together with added oxygen and maintaining essentially the same conditions in each reaction zone,
   (d) maintaining a liquid residence time of from about 40 seconds to about 15 minutes in each reaction zone,
   (e) withdrawing the effluent from the last reaction zone, cooling said effluent and degasifying said cooled effluent in a separation zone wherein two liquid layers are formed, an upper butane layer and a lower reaction product layer,
   (f) externally recycling said upper layer to said reaction zones at the rate of from about 5 to about 30 gallons of recycle per gallon of reaction zones,
   (g) withdrawing liquid reaction product mixture from each reaction zone, cooling and returning same to its respective reaction zone at the rate of from about 1 to about 5 gallons per gallon of said external recycle, and
   (h) withdrawing the lower layer from said separation zone as product.

4. The process of claim 3 wherein three reaction zones are employed.

References Cited by the Examiner

UNITED STATES PATENTS

| | | | |
|---|---|---|---|
| 2,659,746 | 11/1953 | Morgan et al. | 260—597 |
| 2,825,740 | 3/1958 | Armstrong et al. | 260—533 |
| 3,196,182 | 7/1965 | Cox | 260—533 |

FOREIGN PATENTS 865,747  4/1961  Great Britain.

LORRAINE A. WEINBERGEN, Primary Examiner.

LEON ZITVER, Examiner.

D. D. HORWITZ, G. P. D'ANGELO, I. R. PELLMAN, S. B. WILLIAMS, Assistant Examiners.